3,355,322
UNHYDROLYZED ETHYLENE VINYL ACETATE LATEX COMPOSITIONS CONTAINING A PROTECTIVE COLLOID AND FIBROUS MATERIALS COATED WITH SAME
Roy Worrall, Newport, and Eric James Shepherd, Pinner, England, assignors to Monsanto Chemicals Limited, London, England, a British company
No Drawing. Filed Oct. 28, 1963, Ser. No. 319,547
Claims priority, application Great Britain, Nov. 21, 1962, 44,018/62
5 Claims. (Cl. 117—126)

This invention relates to compositions for use in improving the properties of fibrous materials. More particularly, this invention is related to compositions based on copolymers of ethylene and vinyl acetate useful in impregnating and coating fibrous materials.

It is sometimes advantageous to impregnate or coat a fibrous material, such as paper or a textile, with a polymeric substance in order to improve its properties, for instance, its strength or resistance to tearing. Polymeric substances that have been proposed for use in this way include, for example, acrylonitrile-butadiene copolymers, but these have the disadvantages that they increase the stiffness of the treated material and they tend to discolor on ageing.

It has now been discovered that the properties of fibrous material can be improved by treating said fibrous material with a composition containing a protective colloid and a latex of a copolymer of ethylene and vinyl acetate.

An object of this invention is to provide a composition for improving the properties of fibrous materials. Another object of this invention is to provide an article of manufacture comprising fibrous materials having coated thereon a latex of a copolymer of ethylene and vinyl acetate containing a protective colloid. Still another object of this invention is to provide a process for the treatment of fibrous material to improve the properties of said fibrous materials. These and other objects of the invention will become apparent from the following description and the appended claims.

According to the present invention, fibrous materials are treated with a composition containing a minor amount of a protective colloid and a latex of a copolymer of ethylene and vinyl acetate containing from 20 to 70 percent by weight ethylene and correspondingly from 80 to 30 percent by weight of vinyl acetate.

The proportion of copolymer in the coating composition depends on the weight of copolymer that is desired in the treated fibrous material and on the method of application, but generally it is possible to employ coating compositions containing from 5% upwards by weight of the copolymer, especially from 10% to 60% by weight, and preferably from 20 to 50% by weight. A composition containing between 30% and 40% by weight of the copolymer is often very useful.

Although the copolymer of ethylene and vinyl acetate may contain from 20 to 70% by weight of ethylene, preferably the copolymer contains from 25 to 60% by weight of ethylene and copolymers containing between 30 to 50% by weight of ethylene are particularly desirable.

A wide range of compounds is available for use as a protective colloid, including many natural substances, such as casein, various natural gums, gelatine, dextrine and globulin; suitably chemically modified polysaccharides, such as hydrolyzed starch, hydroxyethylcellulose and carboxymethylcellulose; and synthetic protective colloids such as polyvinyl alcohol or a polyvinylpyrrolidone. Polyvinyl alcohol is very suitable, especially a polyvinyl alcohol that has been prepared by partial hydrolysis of a vinyl acetate homopolymer so that it contains some residual acetate ester groups. Another preferred protective colloid is hydroxyethylcellulose.

The coating composition preferably contains between 0.1% and 5% by weight of a protective colloid. Between 0.2% and 1% by weight is often very suitable and excellent results have, in fact, been obtained using about 0.5% by weight.

In treating the fibrous material it is extremely important that a sufficient amount of the coating composition be deposited on the fibrous material. An amount within the range of from 10% to 70% by weight of the copolymer, based on the weight of untreated fibrous material, is suitable for improving the properties of the fibrous material within the scope of this invention. Preferably from 20% to 60% by weight of the copolymer, based on the weight of the untreated fibrous material, is deposited on the fibrous material and between 30 to 50% is the most desirable amount.

Fibrous materials which can be treated include, for example, those based on mineral fibres such as asbestos, but the preferred materials are those of an organic nature, including natural and man-made fibres. Cellulosic fibrous materials, for example textiles such as cotton or jute, and cellulosic papers, are especially suitable, but materials made of animal fibres such as silk or wool, or the various man-made fibres such as rayon, acetate rayon, cellulose triacetate, nylon, polyethylene terephthalate, polypropylene or polyacrylonitrile can also be treated. Included within the term fibrous materials are boards and sheets made essentially of wood or other fibres, for example hardboard or fibreboard.

The coating composition of this invention can also contain any of the additives commonly employed in treating fibrous material with a polymer latex, including, for example, pigments, dyes or other coloring material or plasticizers.

The coating composition of this invention can be applied to the fibrous material when the latter is in the form of a web by means of a roller dipping into a bath of the composition, or by passing the web through the bath and removing excess composition by a doctor blade or a pair of rollers between which the web passes. The web can then be dried either in the atmosphere or by exposing it to a moderately elevated temperature which is usually between 90° C. and 110° C. and ordinarily not more than about 130° C. The invention may, of course, be applied in various other ways. For instance, by adding it to a slurry of the fibrous material.

The composition of this invention can be produced by a process in which ethylene and vinyl acetate are copolymerized in an aqueous emulsion system containing a protective colloid, the ethylene and vinyl acetate being present in a suitable proportion. However, if desired, the colloid can be added subsequently to a suitable latex. Vinyl acetate is in general more easily polymerized than ethylene, so in the mixture of monomers the ethylene content is somewhat higher than that required in the final copolymer. The excess of ethylene to be used in any particular case depends on the pressure and temperature of reaction, but can be determined by means of a few simple tests. The copolymerization is preferably carried out at a pH between 5.0 and 7.5, especially between 5.0 and 6.0, for it has been found that copolymers produced under these conditions have in general a much reduced tendency to discolor on exposure to the atmosphere. A high pressure is desirable during the copolymerization, usually at least 500 pounds per square inch, and especially between 1,000 and 10,000 pounds per square inch. It is preferred to maintain the pressure approximately constant during the course of the copolymerization by replacing ethylene and vinyl acetate that are used up as the reaction proceeds, or by the addition of water under pressure.

A catalyst is preferably employed in forming the copolymer for use in this invention and this catalyst can be any of those that are commonly employed in emulsion poylmerization systems, especially peroxides such as potassium persulphate or cumene hydroperoxide, although azo compounds such as azobisisobutyronitrile are also useful catalysts. Preferably the emulsion contains between 0.1% and 5%, especially from 0.2% to 2% by weight of the catalyst. An emulsifying agent also, of course, needs to be present; it is preferably nonionic. Anionic or cationic agents can be used is desired, but are not preferred because of a tendency for the copolymer to discolor. Many nonionic agents are available including appropriate condensation products of ethylene oxide with, for example, an alcohol (for instance cetyl or lauryl alcohol), a carboxylic acid (for instance lauric, oleic and palmitic acids), a phenol (for instance butylphenol and actylphenol), an amine or a mercaptan. Examples of condensation products of ethylene oxide with respectively an alcohol, a phenol, and an acid which have given excellent results are the lauryl ether of a polyethylene oxide, the condensation product of octyl cresol with 9.5 mols of ethylene oxide, and the monolaurate of a polyethylene glycol of molecular weight 200. Condensation products of the ethylene oxide/carboxylic acid type can also be produced by other means, for instance by esterifying a polyethylene glycol with a carboxylic acid. The products derived from polyethylene glycols having a molecular weight within the range of from 180 to 1300 (that is to say from 4 to 30 ethenoxy groups) are especially valuable. Preferably the alcohol, acid, phenol, amine or mercaptan has from 10 to 20 carbon atoms in the molecule. Propylene glycol and glycerol esters of long-chain alkyl carboxylic acids, and condensates of sorbitan with fatty acids (especially the substance known as sorbitan sesquioleate) can also be used.

Examples of anionic emulsifying agents which can be used if desired in cases where a tendency towards coloration can be tolerated, are common soap, or an alkali metal salt of a sulfated alcohol or a sulfonated hydrocarbon, for instance sodium lauryl sulfate, the sodium salt of dodecylbenzene sulfonic acid or the sodium salt of a petroleum sulfonate. Cationic emulsifying agents which can be used include, for example, one based on a long chain aliphatic hydrocarbon quaternary ammonium salt, for instance octadecylammonium chloride. The product obtained by emulsion copolymerization may need diluting with water before use in treating fibrous materials.

The compositions of the invention are particularly useful in the treatment of fibrous materials, but can also be used in surface-coating compositions such as, for example, paint. The compositions are in fact new as such.

Other polymer dispersions can if desired be mixed with the coating compositions of the invention, including those of a butadiene/acrylonitrile or styrene/acryonitrile copolymer, but the preferred dispersion that can be added in this way is that of a styrene/butadiene copolymer resin. The resin can contain between 50 and 95 parts, especially between 60 and 85 parts by weight of polymerized styrene.

The invention is illustrated by the following examples, but they are not to be construed as limiting the invention in any manner whatsoever.

*Example I*

A solution containing 2.3 grams of potassium persulfate, 3.0 grams of sodium hydrogen phosphate, 4.8 grams of polyvinyl alcohol, and 2.3 grams of a polyoxyethylene lauryl ether (the protective colloid), in 476 cc. of deoxygenated water was heated to 70° C. and placed in a rockable stainless steel reactor of capacity 952 cc. To this was added 476 cc. of a mixture of 47% by weight of ethylene and 53% by weight of vinyl acetate monomer and the mixture compressed to 1800 pounds per square inch. The reactor was rocked at a frequency of 1 cycle per second, the temperature being kept at 70° C., and after an induction period of two hours, it was found that polymerization had started resulting in a decrease of pressure. This decrease was made good by continuously adding a mixture of 16% by weight of ethylene and 84% by weight of vinyl acetate at 1800 pounds per square inch at a rate sufficient to keep the pressure constant.

When 3 hours had elapsed from the beginning of the reaction, the pressure was slowly released, the reactor was opened, and was found to contain 900 cc. of a composion containing the protective colloid and a latex containing 49% by weight of a copolymer of 35 parts by weight of ethylene with 65 parts by weight of vinyl acetate. This had excellent mechanical stability.

The copolymer was precipitated from a small portion of the latex by addition of a saturated aqueous solution of sodium bicarbonate. It was found to have a melt index at 190° C. of 20 grams/10 minutes, measured using a standard polyethylene grader. The copolymer remained clear and colorless even when it was heated at 140° C. for 20 hours in an open dish.

The above composition was diluted with 3½ times its weight of water, and a sheet of highly absorbent cellulose stock paper was immersed in it for a few seconds, passed between a pair of polyethylene rollers, and dried for 2½ hours at 100° C.

The treated paper was found to have been impregnated with 20% by weight (on the weight of dry paper) of the ethylene/vinyl acetate copolymer. It had a tensile strength of 790 pounds per square inch and a tear strength of 370 grams whereas the untreated paper had a tensile strength of 180 pounds per square inch and a tear strength of 80 grams.

The paper was not discolored after exposure to ultraviolet light for 3½ hours or on heating at 150° C. for 2 hours.

The procedure was repeated twice, using compositions which had been diluted with smaller quantities of water so that the treated papers, respectively, contained 50% and 60% by weight of the copolymer (on the weight of paper). The tear strengths of the papers were 400 grams and 490 grams, respectively, and no discoloration occurred under the action of either heat or light.

For the purpose of comparison, a similar paper was treated with 20% by weight of a butadiene-acrylonitrile copolymer deposited from a latex in a similar way. This was found to have a tensile strength of only 390 pounds per inch and a tear strength of 300 grams, and it was considerably discolored on exposure to either ultraviolet light or an elevated temperature. It was much stiffer than the paper which had been treated with 20% by weight of the copolymer of ethylene and vinyl acetate.

*Example II*

This example describes the treatment of paper with several different compositions.

In preparing composition A, the procedure described in Example I was repeated, with the exception that the mixture of monomers charged to the reactor contained 32% by weight of ethylene and 68% by weight of vinyl acetate. The induction period was 1.2 hours and the polymerization was carried on for 6 hours, the pressure being maintained by addition of a mixture of 16% by weight of ethylene and 84% by weight of vinyl acetate as polymerization proceeded.

The composition produced contained 48% by weight of a copolymer of 25 parts by weight of ethylene with 75 parts by weight of vinyl acetate and had excellent mechanical stability.

On precipitating the copolymer from a small portion of the latex by addition of a saturated aqueous solution of sodium bicarbonate, it was found to have a melt index at 190° C. of 155 grams/10 minutes, measured using the standard polyethylene grader. The copolymer remained clear and colorless even when it was heated at 140° C. for 20 hours in an open dish.

For composition B, the copolymerization of Example I was repeated except that the mixture of monomers charged to the reactor contained 42% by weight of ethylene and 58% by weight of vinyl acetate, and the protective colloid used was hydroxyethyl cellulose. The induction period was 1.5 hours and polymerization was carried on for 6 hours, the pressure being maintained by addition of a mixture of 32% by weight of ethylene and 68% by weight of vinyl acetate as polymerization proceeded.

The composition produced had excellent mechanical stability and contained 45% by weight of a copolymer of 45 parts by weight of ethylene with 55 parts by weight of vinyl acetate.

The composition C, a copolymerization was carried out as described in Example I, except that the initial monomer charged contained 67% by weight of ethylene and 33% by weight of vinyl acetate. The induction period was 0.8 hour and polymerization was carried on for 6 hours, a mixture of 47% by weight of ethylene and 53% by weight of vinyl acetate being added as polymerization proceeded in order to keep the pressure constant.

The composition produced had excellent mechanical stability and contained 40% by weight of a copolymer of 55 parts by weight of ethylene with 45 parts by weight of vinyl acetate.

The method described in Example I was used to treat paper with the above three compositions, the amount of copolymer deposited in each case being 20% by weight of the untreated paper.

The treated papers were then tested as before and the results obtained are set out below:

| Paper treated with composition | Percent ethylene in copolymer | Tensile strength (pounds per square inch) | Tear strength (grams) |
|---|---|---|---|
| (a) | 25 | 520 | 310 |
| (b) | 45 | 350 | 270 |
| (c) | 55 | 290 | 320 |

None of the papers was discolored by the ultra-violet light and heat-aging tests.

It can be seen from the above results that the paper treated with the composition of the invention had greatly improved properties, not only when compared with the untreated paper, but also in comparison with that treated with the butadiene-acrylonitrile copolymer latex.

We claim:
1. An article of manufacture comprising a fibrous material coated with from 10 to 70 percent by weight of the fibrous material of a composition consisting essentially of from 10 to 60% by weight of an unhydrolyzed copolymer of ethylene/vinyl acetate having from 20 to 70% by weight ethylene and correspondingly from 80 to 30% by weight vinyl acetate, said composition also containing from 0.1 to 5 percent by weight of a protective colloid.

2. The article of manufacture of claim 1 wherein the fibrous material is chosen from the group consisting of mineral fibres, cellulose fibres, animal fibres, rayon, acetate rayon, nylon, polyethylene terephthalate, polypropylene and polyacrylonitrile.

3. The article of manufacture of claim 1 wherein the fibrous material is paper.

4. The article of manufacture of claim 2 wherein the protective colloid is chosen from the group consisting of casein, natural gum, gelatine, dextrine, globulin, hydrolyzed starch, hydroxyethylcellulose, carboxymethylcellulose, polyvinyl alcohol, and polyvinylpyrrolidone.

5. A composition useful in improving the properties of fibrous materials which comprises a latex consisting essentially of 10 to 60% by weight of an unhydrolyzed ethylene/vinyl acetate copolymer containing from 20 to 70% by weight ethylene and correspondingly from 80 to 30% by weight vinyl acetate and from 0.1 percent to 5 percent by weight of the composition of a protective colloid.

References Cited
UNITED STATES PATENTS

| | | | |
|---|---|---|---|
| 2,397,866 | 4/1946 | McQueen | 96—84 |
| 2,506,339 | 5/1950 | Buckley et al. | 260—8 X |
| 2,703,794 | 3/1955 | Roedel | 260—87.3 |
| 2,843,505 | 7/1598 | Riedel | 117—102 |
| 2,956,962 | 10/1960 | Wise et al. | 260—8 |
| 3,035,943 | 5/1962 | Nottebohm et al. | 117—102 X |
| 3,055,758 | 9/1962 | McDonald | 260—8 X |
| 3,069,279 | 12/1962 | Hartley et al. | 260—8 X |
| 3,116,827 | 1/1964 | Gilchrist | 260—8 X |
| 3,232,895 | 2/1966 | Klein et al. | 260—27 |

WILLIAM D. MARTIN, *Primary Examiner.*

R. HUSACK, *Assistant Examiner.*